April 28, 1931.  B. N. PULVER  1,802,532

PROCESS FOR THE PRODUCTION OF FOOD PRODUCTS

Filed Feb. 3, 1928

Inventor
Bruce Nelson Pulver
By Albert E. Lynch
Attorney

Patented Apr. 28, 1931

1,802,532

UNITED STATES PATENT OFFICE

BRUCE NELSON PULVER, OF AKRON, OHIO, ASSIGNOR, BY MESNE ASSIGNMENTS, TO ALL IN ONE CORPORATION OF AMERICA, A CORPORATION OF NEVADA

PROCESS FOR THE PRODUCTION OF FOOD PRODUCTS

Application filed February 3, 1928. Serial No. 251,518.

This invention relates to a new and improved process for the production of food products and particularly to a new and improved process for providing an edible envelope or casing, such as the sandwich biscuit shown in my pending application, filed November 16, 1927, Serial No. 233,631.

The object of this invention is to provide an expeditious and quick method of making an edible envelope or casing suitable for receiving sandwich filling, such as a sausage, frankfurter, or wiener-wurst, and practically enclosing the same.

With these objects in view and with the intention of securing other advantages which will hereinafter appear, my invention consists in the process hereinafter described in the specification and particularly set forth in the claims.

Figure 1:
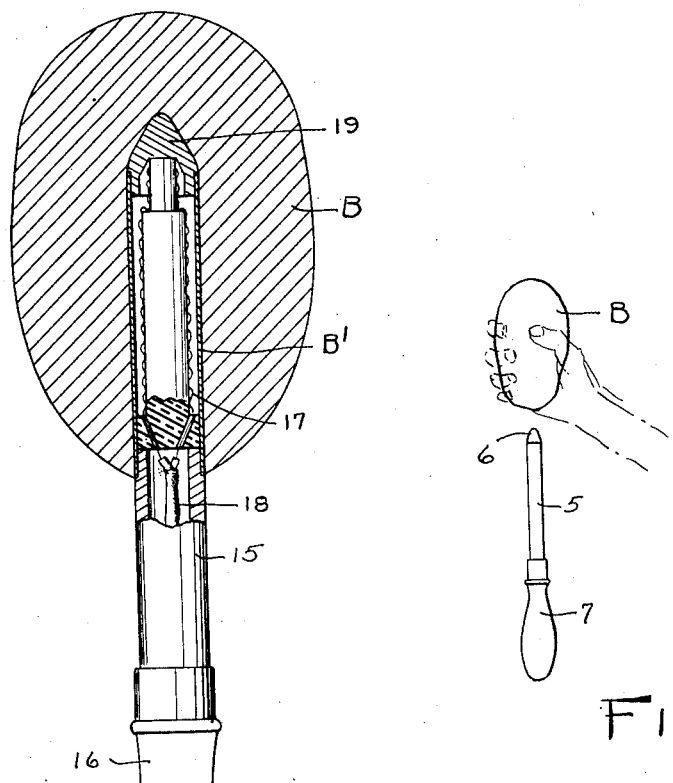
Figure 2:
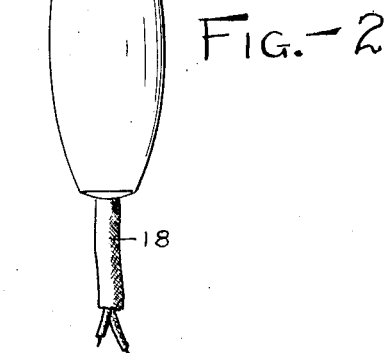

Referring to the accompanying drawings, Fig. 1 illustrates an edible product such as a mass of baked dough commonly termed a biscuit together with one type of a device for carrying out my process. Fig. 2 is a view showing the biscuit in cross section and the device in a modified form inserted within the biscuit.

An implement which I may use in carrying out my process is shown in Fig. 1. This implement which I term a piercing and compacting device may comprise a body portion 5 provided with a pointed end portion 6. The body portion 5 is preferably mounted on a handle portion 7. The cross sectional area of the piercing and compacting device will generally be a little greater than the cross sectional area of the desired cavity or chamber in the envelope or casing which is to be produced.

In carrying out my process I take a product, shown at B, resulting from baking a quantity of dough so that a more or less definite crust is formed on the exterior of the product while the interior thereof is light and porous. I then take the piercing and compacting device and insert the pointed end thereof at one end of the said baked product and cause the device to move inwardly, centrally, and longitudinally of said product to within a short distance of the opposite end of said product. The insertion of said device into said product will displace the material at the center of said product and force it outwardly in all directions and will compact it to a certain extent in the immediate vicinity of said device. The device may also be given a slight twisting or rotary movement as it is inserted into and longitudinally of said product.

The device is permitted to remain within the product for the length of time necessary to permit the material of the product to set. When the device is withdrawn from the product a cavity or chamber B' will have been formed within said product suitable for the reception of any sandwich filling which it may be desired to use.

I have found that if the piercing and compacting device be heated it will more easily pierce and pass into said product, and also that if sufficient heat be supplied to said device the wall of the cavity or chamber formed in the product will be seared or toasted. This searing or toasting of the wall of the cavity or chamber not only gives a more definite set to the wall of the chamber but also greatly enhances the taste of the envelope or casing produced.

In Fig. 2 I have shown a suitable device which may be used in carrying out my process when it is desired to sear or toast the wall of the cavity or chamber. The device may comprise a tubular member 15 which is suitably mounted upon a handle 16 preferably formed of an insulating material. Within the tubular member 15 is a suitable electrical heating unit 17 which may be connected with a source of electricity by means of wires 18 connected to said heating unit and extending down through the tubular member 15 and the handle 16. The forward end of the tubular member is closed by a pointed plug 19.

I do not wish to limit myself to any particular type or form of implement for use in carrying out my process as various devices may be employed and different methods for heating the same may be employed when the heating of the device is desirable.

What I claim is:

1. A new and improved process for preparing an edible which consists in initially piercing the solid body of a preformed baked dough edible with a heated element, continuing the piercing displacement of said heated element within the body of said edible to form a cavity therein, and retaining said heated element within said cavity for a period sufficient to toast the wall thereof.

2. A new and improved process for preparing an edible which consists in initially piercing the solid body of a preformed baked dough edible with a heated element, continuing the piercing displacement of said heated element within the body of said edible to form a substantially cylindrical cavity therein, and retaining said heated element within said cavity for a period sufficient to toast the wall thereof.

3. A new and improved process for preparing an edible which consists in initially, piercing the solid body of a preformed baked dough edible with a pointed heated element, continuing the piercing displacement of said heated element within the body of said edible to form a cylindrically elongated end enclosed cavity therein and retaining said heated element within said cavity for a period sufficient to toast the wall thereof.

4. A new and improved process for preparing an edible which consists in initially piercing the solid body of a preformed baked dough edible with a pointed heated element, continuing the piercing displacement of said heated element within the body of said edible to form a cylindrically elongated end enclosed cavity therein and retaining said heated element within said cavity for a period sufficient to impart a retaining shape to said cavity.

In testimony whereof I affix my signature.

BRUCE NELSON PULVER.